United States Patent
Carlson et al.

(10) Patent No.: US 9,574,460 B2
(45) Date of Patent: Feb. 21, 2017

(54) SUPPORT ARRANGEMENT FOR A TRANSITION PIECE OF A GAS TURBINE ENGINE

(71) Applicant: Siemens Energy, Inc., Orlando, FL (US)

(72) Inventors: Andrew Carlson, Jupiter, FL (US); William W. Pankey, Palm Beach Gardens, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 323 days.

(21) Appl. No.: 14/527,860

(22) Filed: Oct. 30, 2014

(65) Prior Publication Data

US 2016/0215698 A1  Jul. 28, 2016

(51) Int. Cl.
| | |
|---|---|
| F02C 7/20 | (2006.01) |
| F23R 3/60 | (2006.01) |
| F01D 25/28 | (2006.01) |
| F01D 9/02 | (2006.01) |

(52) U.S. Cl.
CPC ............... *F01D 25/28* (2013.01); *F01D 9/023* (2013.01); *F23R 3/60* (2013.01); *F02C 7/20* (2013.01); *F05D 2230/642* (2013.01); *F05D 2240/90* (2013.01); *F05D 2250/241* (2013.01); *F05D 2260/31* (2013.01)

(58) Field of Classification Search
CPC ............. F01D 25/28; F01D 9/023; F23R 3/60
See application file for complete search history.

(56) References Cited

U.S. PATENT DOCUMENTS

| | | | |
|---|---|---|---|
| 4,422,288 A * | 12/1983 | Steber | F01D 9/023 60/39.37 |
| 5,513,547 A | 5/1996 | Lovelace | |
| 5,782,365 A * | 7/1998 | Zreloff | B07B 1/46 209/394 |
| 6,442,946 B1 * | 9/2002 | Kraft | F01D 9/023 60/796 |
| 7,197,803 B2 | 4/2007 | Kemsley et al. | |
| 7,918,433 B2 | 4/2011 | Melton et al. | |
| 9,359,955 B2 * | 6/2016 | Pankey | F01D 9/023 |
| 2009/0101788 A1 | 4/2009 | Kidder et al. | |
| 2014/0023489 A1 * | 1/2014 | Fujimoto | F16J 15/0887 415/170.1 |

* cited by examiner

*Primary Examiner* — Dwayne J White
*Assistant Examiner* — Topaz L Elliott

(57) ABSTRACT

A support arrangement (10) for a transition piece (12) of a gas turbine engine (14). The support arrangement includes a mounting bracket (16) for the transition piece and a pin (18) supporting the mounting bracket in an interior (20) of the gas turbine engine and extending through an opening (22) in a casing (24) to an exterior (26) of the gas turbine engine. The support arrangement further includes a spherical washer (28, 38) positioned between the pin and either the mounting bracket or the casing.

20 Claims, 4 Drawing Sheets

SUPPORT ARRANGEMENT FOR A TRANSITION PIECE OF A GAS TURBINE ENGINE

FIELD OF THE INVENTION

The invention relates to gas turbine engines, and more particularly to a support arrangement for a transition piece of a gas turbine engine.

BACKGROUND OF THE INVENTION

Turbine engines generally include three sections: a compressor section, a combustor section and a turbine section. In some turbine engine designs, a duct, known as a transition piece, extends between the combustor section and the turbine section. The transition piece serves many purposes, one of which is to direct the hot gases produced in the combustor section to the turbine section.

Precise alignment between the transition piece and a casing of the combustor section is critical for proper engine operation. FIG. 1 depicts a conventional support arrangement for alignment between an inlet end of a transition piece 112 and a casing 124 of a gas turbine engine 114. The support arrangement includes a mounting bracket 116 secured to the transition piece 112 for aligning the transition piece 112 with the casing 124 within an interior 120 of the gas turbine engine 114. The height of the transition piece 112 in a radial direction 123 is adjusted, by selectively positioning shims between a base 115 of the mounting bracket 116 and a surface of the casing 124.

BRIEF DESCRIPTION OF THE DRAWINGS

The invention is explained in the following description in view of the drawings that show.

DETAILED DESCRIPTION OF THE INVENTION

Figure 1:
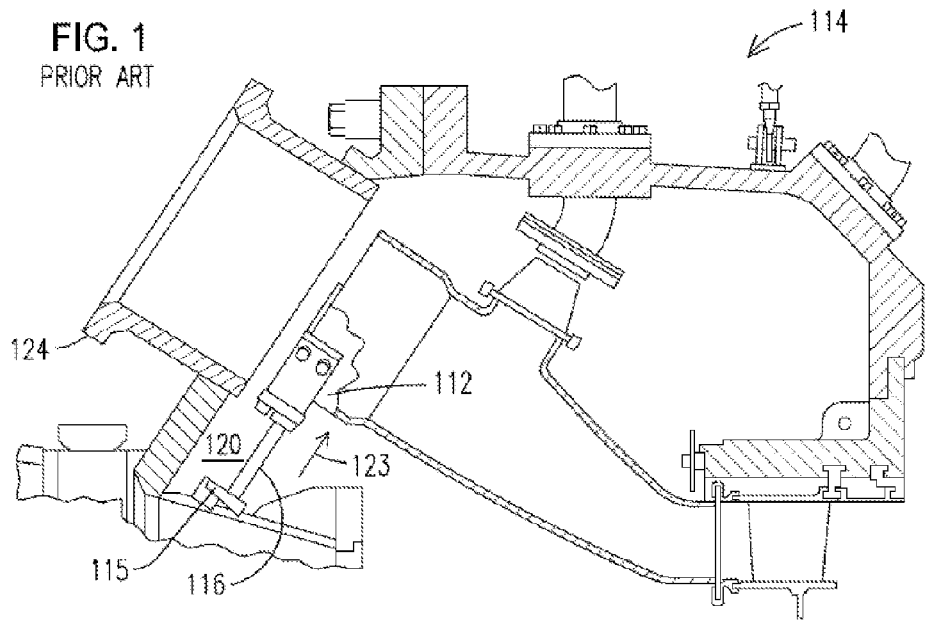
FIG. 1 is a cross-sectional side view of a conventional support arrangement for a transition piece in a gas turbine engine.

Based on the above-discussed features of the conventional support arrangement for the transition piece 112, the inventors recognized that the conventional support arrangement is limited to adjustment of a height of the transition piece 112 in the radial direction 123, during the alignment of the transition piece 112 with the casing 124. Thus, the inventors recognized that it would be advantageous to provide a support arrangement for a transition piece, which is not limited to adjustment of the radial height of the transition piece. Specifically, the inventors recognized that it would be advantageous to provide a support arrangement for a transition piece that accommodates adjustment in a circumferential plane, during the alignment of the transition piece with the casing.

Additionally, the inventors recognized that the conventional support arrangement is limited to alignment of the transition piece 112 with the casing 124 from within the interior 120 of the gas turbine engine 114, with the combustor removed from the casing 124. Thus, the inventors recognized that it would be advantageous to provide a support arrangement for a transition piece, which is not limited to alignment of the transition piece 112 from within the interior 120 of the gas turbine engine 114. Specifically, the inventors recognized that it would be advantageous to provide a support arrangement for a transition piece that features alignment of the transition piece from the exterior of the gas turbine engine, while the combustor is positioned within the casing.

Figure 2B:
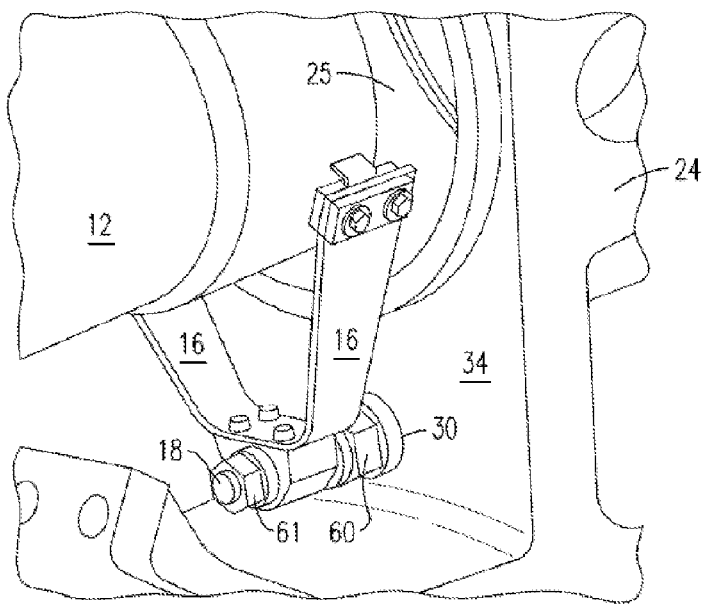
FIG. 2B is a perspective view of the support arrangement of FIG. 2A from an interior of the gas turbine engine.
Figure 2A:
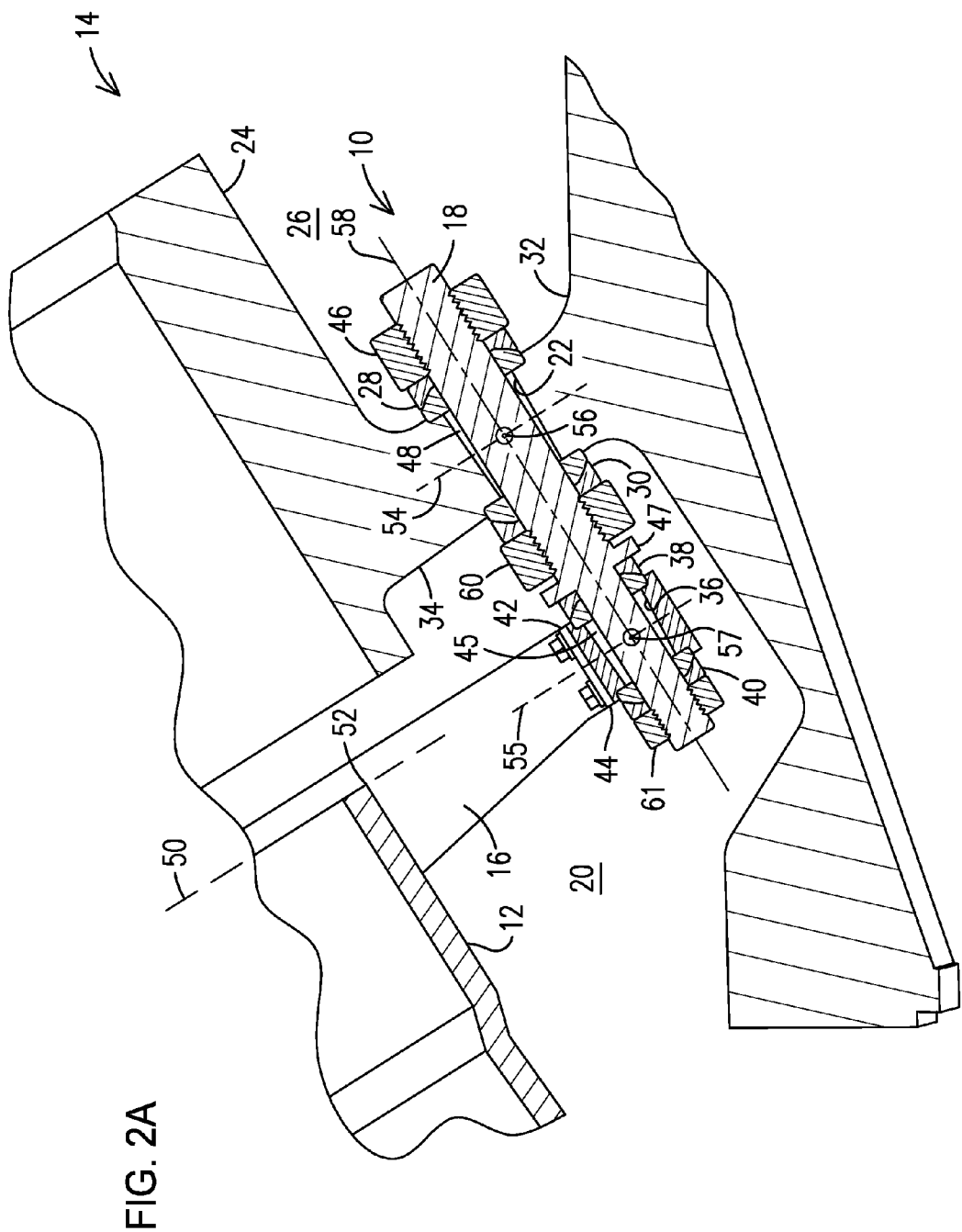
FIG. 2A is a cross-sectional side view of a support arrangement for a transition piece in a gas turbine engine.

FIG. 2A illustrates a support arrangement 10 for a transition piece 12 of a gas turbine engine 14. The support arrangement 10 includes a mounting bracket 16 for the transition piece 12, to support an end 52 of the transition piece 12 in alignment with a casing 24 of the gas turbine engine 14. Prior to an operation of the gas turbine engine 14, the mounting bracket 16 adjusts the alignment of the end 52 of the transition piece 12 with an opening 25 (FIG. 2B) of the casing 24. One embodiment of the present invention features alignment of the end 52 of the transition piece 12 from an exterior 26 of the casing 24 of the gas turbine engine 14, after a combustor (not shown) is positioned in the opening 25 of the casing 24. Another embodiment of the present invention features alignment of the end 52 of the transition piece 12 from an interior 20 of the casing 24 of the gas turbine engine 14, prior to positioning the combustor (not shown) in the opening 25 of the casing 24.

As illustrated in FIG. 2A, the support arrangement 10 further includes a pin 18 supporting the mounting bracket 16 in the interior 20 of the gas turbine engine 14. The pin 18 extends through an opening 22 in the casing 24 to the exterior 26 of the gas turbine engine 14. As illustrated in FIG. 2A, the opening 22 is sized to include a gap 48 between the pin 18 and the casing 24, so that the pin 18 is movable within the opening 22 from the exterior 26 of the gas turbine engine 14. By moving the pin 18 within the opening 22, the mounting bracket 16 is moved, and correspondingly, the alignment of the transition piece 12 is varied within a circumferential plane 50 of the end 52 of the transition piece 12.

In one embodiment of the present invention, the pin 18 is movable within the opening 22 of the casing 24, by rotating the pin 18 about an axis 54, 56 that is orthogonal to a longitudinal axis 58 of the pin 18. By rotating the pin 18 about either axis 54, 56, the mounting bracket 16 moves within the circumferential plane 50, thereby varying the alignment of the transition piece 12 within the circumferential plane 50, relative to the casing 24. In one embodiment, by rotating the pin 18 about the axis 56, the pin 18 rotates in the opening 22 within the plane of FIG. 2A, causing the mounting bracket 16 to move within the circumferential plane 50. Additionally, in another embodiment, by rotating the pin 18 about the axis 54, the pin rotates in the opening 22 within a plane perpendicular to the plane of FIG. 2A, causing the mounting bracket 16 to move within the circumferential plane 50. The range of rotation of the pin 18 within the opening 22 is based on the sizing of the gap 48. In an exemplary embodiment, the gap 48 is sized to be approximately 5 mm, to correspond to a range of adjustment of the transition piece 12 within the circumferential plane 50 of approximately ±3 degrees. In an exemplary embodiment, an outer diameter of the pin 18 may be approximately 50 mm and a length of the pin 18 may be approximately 350 mm. In an exemplary embodiment, the opening 22 may be sized with an inner diameter of approximately 60 mm and a length of approximately 80 mm. However, these numerical dimensions are merely exemplary and the pin 18 and the casing 24 may be sized with any range of dimensions, provided that the pin 18 and the casing 24 are capable of adjusting the alignment of the transition piece 12 relative to the casing 24.

Figure 2C:
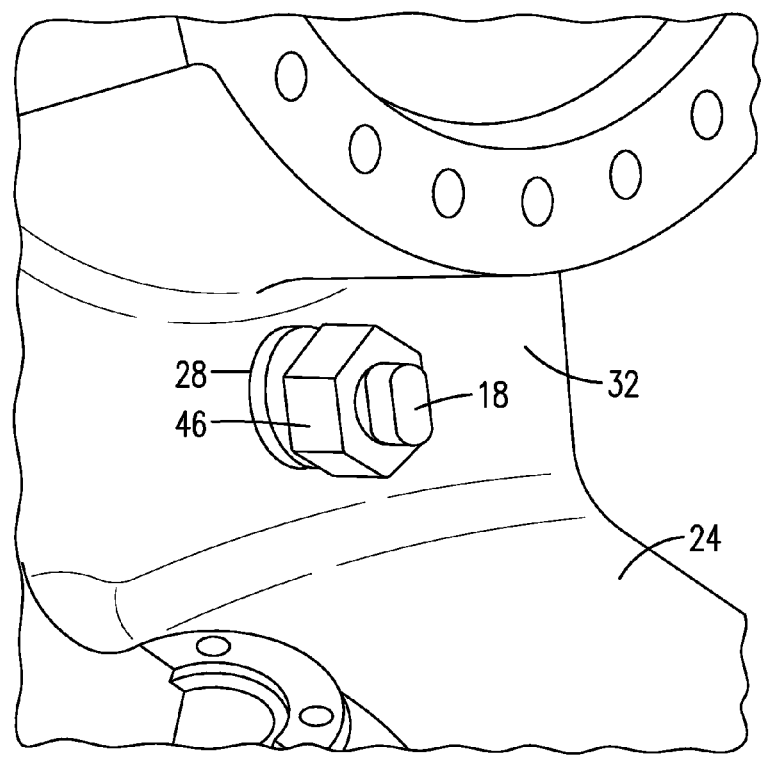
FIG. 2C is a perspective view of the support arrangement of FIG. 2A from an exterior of the gas turbine engine.
Figure 3:
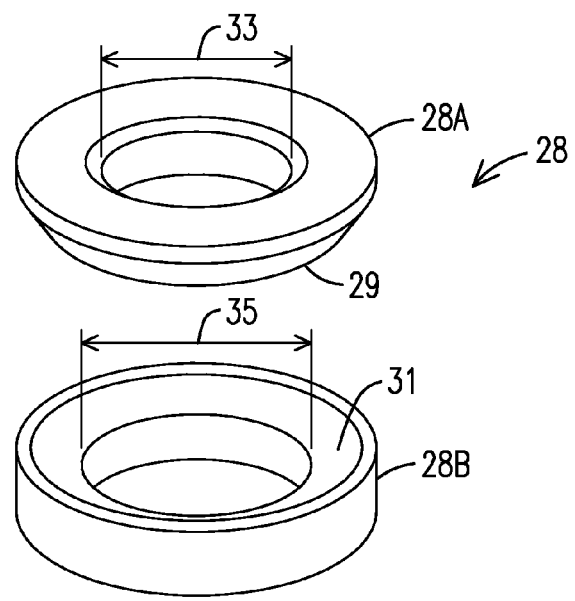
FIG. 3 is a side plan view of a spherical washer of the support arrangement of FIG. 2A.

As further illustrated in FIGS. 2A and 2C, to accommodate the rotation of the pin 18 within the opening 22, a spherical washer 28 is positioned between the pin 18 and an exterior side 32 of the casing 24 within the exterior 26 of the gas turbine engine 14. Additionally, as illustrated in FIGS. 2A and 2B, to accommodate the rotation of the pin 18 within the opening 22, a spherical washer 30 is positioned between the pin 18 and an interior side 34 of the casing 24 within the interior 20 of the gas turbine engine 14. FIG. 3 depicts an exemplary embodiment of the spherical washer 28 of FIG. 2A, including a male washer 28A with a convex spherical surface 29 and a female washer 28B with a matching concave spherical surface 31 to the convex spherical surface 29. In an exemplary embodiment, an inner diameter 33 of the male washer 28A is smaller than an inner diameter 35 of the female washer 28B. Additionally, the inner diameter 33 of the male washer 28A is sized to fit an outer diameter of the pin 18, so that the male washer 28A is securely fit around the outer diameter of the pin 18 as the pin 18 rotates within the opening 22. When the male washer 28A and female washer 28B are placed together, the convex spherical surface 29 freely moves along the concave spherical surface 31, to compensate for a non-orthogonal orientation between the pin 18 and the exterior side 32 of the casing 24, as the pin 18 is rotated within the opening 22. The spherical washer 30 has a similar structure as the spherical washer 28 depicted in FIG. 3. In an exemplary embodiment, the dimensions of the spherical washers 28, 30 include an inner diameter of approximately 50 mm, an outer diameter of approximately 80 mm and a radius of curvature of approximately 60 mm. In an exemplary embodiment, the spherical washers 28, 30 are made from stainless steel material. Indeed, the spherical washers are discussed as merely one example of structural components that may be positioned between the pin 18 and the sides 32, 34 of the casing 24, to accommodate the rotation of the pin 18 within the opening 22, and the embodiments of the present invention include any structure that is capable of compensating for non-orthogonal orientation between the pin 18 and the sides 32, 34 of the casing 24.

In another embodiment of the present invention, the pin 18 is rotatable about the longitudinal axis 58 within the opening 22. By rigidly attaching the bracket 16 to the pin 18 and rotating the pin 18 about the longitudinal axis 58 of the pin 18, the mounting bracket 16 moves within the circumferential plane 50, thereby varying the alignment of the transition piece 12 within the circumferential plane 50, relative to the casing 24. In an exemplary embodiment, the pin 18 may be rotated about the longitudinal axis 58 within a range of ±10 degrees, for alignment of the transition piece 12 with the casing 24 within the circumferential plane 50.

As further illustrated in FIGS. 2A and 2C, a fastener 46, such as a nut, is positioned on the exterior side 32 of the casing 24. After rotation of the pin 18 within the opening 22 using the spherical washers 28, 30, such that the transition piece 12 has a desired alignment with the casing 24, the fastener 46 is used to tighten the pin 18 relative to the spherical washer 28, to maintain the desired alignment of the transition piece 12 relative to the casing 24. In an exemplary embodiment, the fastener 46 is a threaded nut that engages external threads (not shown) on an external surface of the pin 18, until the fastener 46 tightens the spherical washer 28 against the exterior side 32 of the casing 24. In an exemplary embodiment, the fastener 46 may be a threaded nut with an inner diameter of approximately 50 mm.

Another embodiment of the present invention is provided, for additional adjustment of the alignment of the transition piece 12 relative to the casing 24. As illustrated in FIGS. 2A and 2B, the pin 18 extends through an opening 36 in the mounting bracket 16. A spherical washer 38 is positioned between the pin 18 and a first side 42 of the mounting bracket 16 within the interior 20 of the gas turbine engine 14. Additionally, a spherical washer 40 is positioned between the pin 18 and a second side 44 of the mounting bracket 16 opposite to the first side 42. The spherical washers 38, 40 are structured similar to the spherical washer 28 depicted in FIG. 3, and are used to compensate for a non-orthogonal orientation between the pin 18 and the first and second sides 42, 44 of the mounting bracket 16, as the pin 18 is rotated within the opening 36.

As with the opening 22 in the casing 24, the opening 36 in the mounting bracket 16 is sized to include a gap 45 between the pin 18 and the mounting bracket 16. The pin 18 is movable within the opening 36, to vary the alignment of the transition piece 12 relative to the casing 24. In one embodiment of the present invention, the pin 18 is movable within the opening 36, by rotating the pin 18 about an axis 55, 57 that is orthogonal to the longitudinal axis 58 of the pin 18. By rotating the pin 18 about either axis 55, 57, the mounting bracket 16 moves within the circumferential plane 50, thereby varying the alignment of the transition piece 12 within the circumferential plane 50, relative to the casing 24. In one embodiment, by rotating the pin 18 about the axis 57, the pin 18 rotates in the opening 36 within the plane of FIG. 2A, causing the mounting bracket 16 to move within the circumferential plane 50. Additionally, in another embodiment, by rotating the pin 18 about the axis 55, the pin rotates in the opening 36 within a plane perpendicular to the plane of FIG. 2A, causing the mounting bracket 16 to move within the circumferential plane 50. The range of rotation of the pin 18 within the opening 36 is based on the sizing of the gap 45. In an exemplary embodiment, the gap 45 is sized to be approximately 5 mm, to correspond to a range of adjustment of the transition piece 12 within the circumferential plane 50 of approximately ±3 degrees. As illustrated in FIG. 2A, an outer diameter of the pin 18 within the opening 36 of the mounting bracket 16 is less than an outer diameter of the pin 18 within the opening 22 of the casing 24. In another exemplary embodiment, an outer diameter of the pin 18 within the mounting bracket 16 may be approximately 30 mm.

As further illustrated in FIGS. 2A and 2B, a fastener 61, such as a nut, is positioned on the second side 44 of the mounting bracket 16. After rotation of the pin 18 using the spherical washers 38, 40 within the opening 36, such that the transition piece 12 has a desired alignment with the casing 24, the fastener 61 is used to tighten the pin 18 relative to the spherical washer 40, to maintain the desired alignment of the transition piece 12 relative to the mounting bracket 16. In an exemplary embodiment, the fastener 61 is a threaded nut that engages external threads (not shown) on an external surface of the pin 18, until, the fastener 61 tightens the spherical washer 38 against a flange 47 of the pin 18.

Although FIG. 2A illustrates the spherical washers 38, 40 being used to rotate the pin 18 within the opening 36 and the spherical washers 28, 30 being used to rotate the pin 18 within the opening 22, the spherical washers 38, 40 need not be used in conjunction with the spherical washers 28, 30, to vary the alignment of the transition piece 12 relative to the casing 24. In one embodiment of the present invention, the spherical washers 28, 30 are used to rotate the pin 18 within the opening 22 and vary the alignment of the transition piece 12, while the pin 18 passes through an opening in the mounting bracket 16 that does not include the spherical washers 38, 40. Similarly, in one embodiment of the present invention, the spherical washers 38, 40 are used to rotate the pin 18 within the opening 36 and vary the alignment of the transition piece 12, while the pin 18 passes through an opening in the casing 24 that does not include the spherical washers 28, 30.

Figure 4:
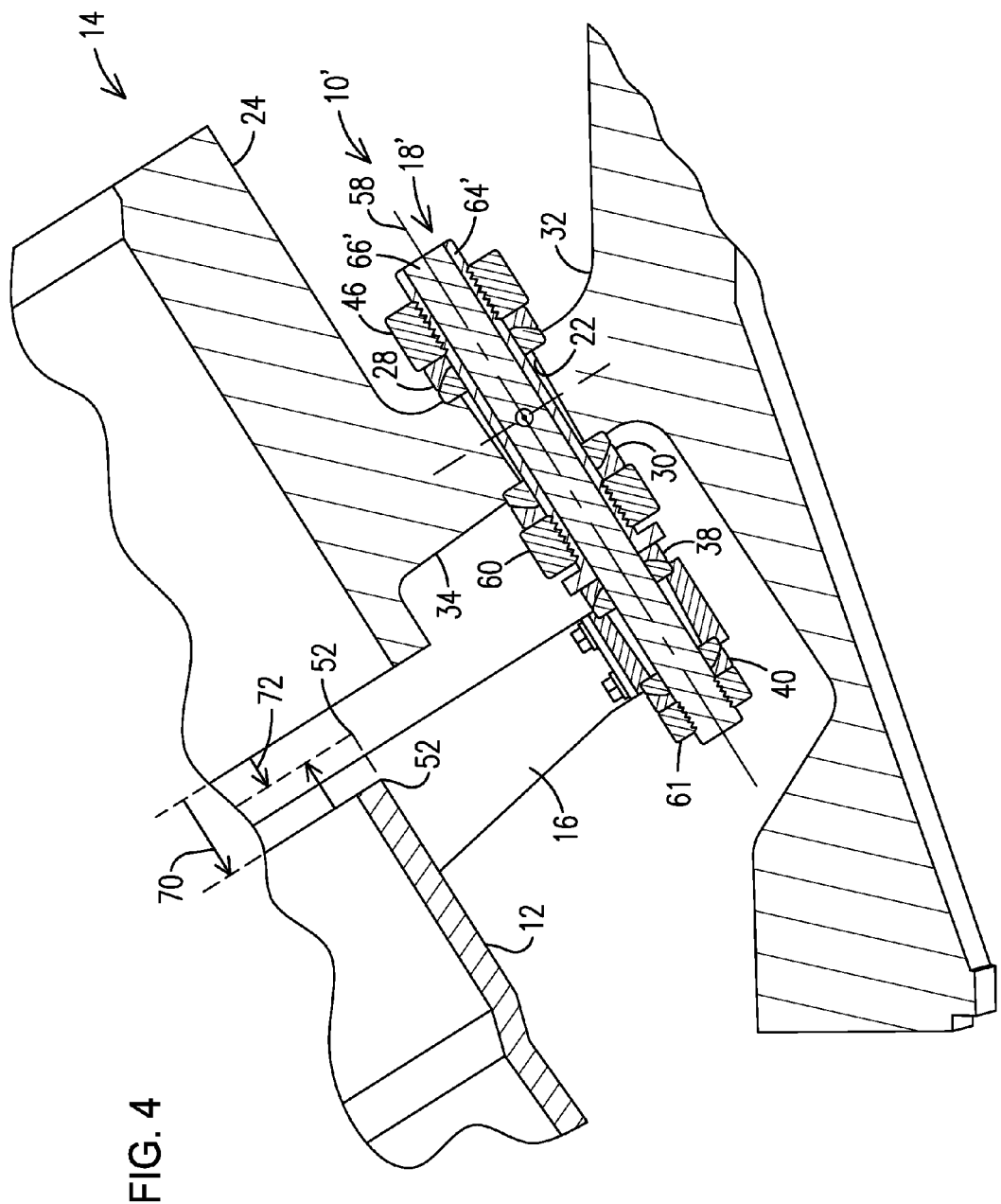
FIG. 4 is a cross-sectional side view of a support arrangement for a transition piece in a gas turbine engine.

In another embodiment of the present invention, the alignment of the transition piece 12 relative to the casing 24 may be adjusted in a longitudinal direction from the exterior 26 of the gas turbine engine 14. FIG. 4 illustrates an alternate embodiment of the support arrangement 10' including a pin 18' extending through the opening 22 of the casing 24, where the pin 18' is rotatable within the opening 22 about the longitudinal axis 58 of the pin 18'. As illustrated in FIG. 4, the pin 18' includes an outer shaft 64' that is threadably secured to a fastener 60 within the interior 20 of the gas turbine engine 14. As illustrated in FIG. 4, the fastener 60 is used to tighten the spherical washer 30 against the interior side 34 of the casing 24. The pin 18' further includes an inner shaft 66' that is rotatably coupled to the mounting bracket 16. The operation of the support arrangement 10' involves a pre-alignment phase. During the pre-alignment phase, the inner shaft 66' and the outer shaft 64' are rotatably decoupled, using any means known to one skilled in the art. Additionally, during the pre-alignment phase, the fastener 60 is rotatably fixed relative to the outer shaft 64', using any means known to one skilled in the art. After the pre-alignment phase, an alignment phase is performed, during which the outer shaft 64' is rotated from the exterior 26 of the gas turbine engine 14, which causes the mounting bracket 16 to move and correspondingly, the end 52 of the transition piece 12 to move from an initial location 70 to a desired location 72 in a longitudinal direction parallel to a longitudinal axis 58 of the pin 18'. Additionally, the rotation of the outer shaft 64' from the exterior 26 adjusts the axial position of the fastener 60 relative to the pin 18'. When the end 52 of the transition piece 12 is moved to the desired longitudinal location 72 relative to the casing 24, the rotation of the outer shaft 64' is ceased, the inner shaft 66' and outer shaft 64' are recoupled and the fastener 60 is released relative to the outer shaft 64'.

During operation of the support arrangement 10, the fastener 46 within the exterior 26 of the gas turbine engine 14 is initially loosened from the spherical washer 28 and exterior side 32. The pin 18 is then rotated within the opening 22 from the exterior 26, about one or more of the axis 54, 56, 58, to vary the alignment of the transition piece 12 within the circumferential plane 50, relative to the casing 24. The fastener 46 is then re-tightened against the spherical washer 28 and the exterior side 32 of the casing 24, to maintain the desired alignment of the transition piece 12, relative to the casing 24. Optionally, prior to tightening the fastener 46, if axial adjustment of the transition piece 12 relative to the casing 24 is desired, the outer shaft 64' of the pin 18' is rotated relative to the fastener 60, to vary the axial position of the end 52 of the transition piece 12, relative to the casing 24. Additionally, if the combustor (not shown) is not positioned in the casing 24, additional optional adjustment of the transition piece 12 within the circumferential plane 50 may be performed by loosening the fastener 61, rotating, the pin 18 within the opening 36 about one or more of the axis 55, 57 and re tightening the fastener 61 against the spherical washer 40 and second side 44 of the mounting bracket 16. In an exemplary embodiment, the alignment of the transition piece 12 using the support arrangement 10 is performed to align the end 52 of the transition piece 12 within a threshold range of an, inlet of the combustor positioned within the casing 24, where the threshold range is based on an alignment range of a spring seal (not shown) positioned between the end 52 of the transition piece 12 and the combustor inlet. In an exemplary embodiment, the threshold range is 1-3 mm, for example.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A support arrangement for a transition piece of a gas turbine engine, the support arrangement comprising:
 a mounting bracket for the transition piece;
 a pin supporting the mounting bracket in an interior of the gas turbine engine and extending through an opening in a casing of the gas turbine engine to an exterior of the gas turbine engine; and
 a spherical washer positioned between the pin and one of the mounting bracket and the casing.

2. The support arrangement of claim 1, wherein the spherical washer is positioned between the pin and an exterior side of the casing, said support arrangement further comprising a second spherical washer positioned between the pin and an interior side of the casing.

3. The support arrangement of claim 1, wherein the pin extends through an opening in the mounting bracket, wherein the spherical washer is positioned between the pin and a first side of the mounting bracket, said support arrangement further comprising a second spherical washer positioned between the pin and a second side of the mounting bracket opposite to the first side.

4. The support arrangement of claim 3, wherein the opening in the mounting bracket is sized to include a gap between the pin and the mounting bracket and wherein the pin is movable within the opening, to vary an alignment of the transition piece relative to the casing.

5. The support arrangement of claim 1, further comprising a fastener configured to tighten the pin relative to the spherical washer to maintain an alignment of the transition piece relative to the casing.

6. The support arrangement of claim 5, wherein the fastener is positioned on an exterior side of the casing.

7. The support arrangement of claim 6, wherein the opening is sized to include a gap between the pin and the casing, and wherein the pin is movable within the opening from the exterior of the gas turbine engine to vary the alignment of the transition piece in a circumferential plane of an end of the transition piece.

8. The support arrangement of claim 7, wherein the pin is rotatable about an axis orthogonal to a longitudinal axis of the pin.

9. The support arrangement of claim 7, wherein the pin is rotatable about a longitudinal axis of the pin.

10. The support arrangement of claim 1, further comprising a fastener positioned on an interior side of the casing, wherein an axial position of the fastener relative to the pin is adjustable from the exterior of the gas turbine engine to vary an axial location of the transition piece relative to the casing.

11. The support arrangement of claim 10, wherein the pin includes an outer shaft threadably secured to the fastener and an inner shaft rotatably coupled to the mounting bracket; wherein the axial position of the fastener relative to the pin is adjustable based on relative rotation between the outer shaft and the fastener initiated from the exterior of the gas turbine engine.

12. A gas turbine engine comprising:
    a casing;
    a transition piece;
    a mounting bracket for the transition piece; and
    a pin supporting the mounting bracket in an interior of the gas turbine engine and extending through an opening in the casing to an exterior of the gas turbine engine;
    wherein the pin is movable within the opening from the exterior of the gas turbine engine to vary an alignment of the transition piece relative to the casing.

13. The gas turbine engine of claim 12, wherein the pin is rotatable about an axis orthogonal to a longitudinal axis of the pin.

14. The gas turbine engine of claim 12, wherein the pin is rotatable about a longitudinal axis of the pin.

15. The gas turbine engine of claim 12, further comprising a spherical washer positioned between the pin and one of the mounting bracket and the casing.

16. The gas turbine engine of claim 15, wherein the spherical washer is positioned between the pin and an exterior side of the casing, said gas turbine engine further comprising a second spherical washer positioned between the pin and an interior side of the casing.

17. The gas turbine engine of claim 15, wherein the pin extends through an opening in the mounting bracket, wherein the spherical washer is positioned between the pin and a first side of the mounting bracket, said gas turbine engine further comprising a second spherical washer positioned between the pin and a second side of the mounting bracket opposite to the first side.

18. The gas turbine engine of claim 15, further comprising a fastener configured to tighten the pin relative to the spherical washer to maintain the alignment of the transition piece relative to the casing.

19. A support arrangement for a transition piece of a gas turbine engine, the support arrangement comprising:
    a mounting bracket for the transition piece;
    a pin supporting the mounting bracket in an interior of the gas turbine engine and extending through an opening in a casing to an exterior of the gas turbine engine;
    a spherical washer positioned between the pin and one of the mounting bracket and the casing; and
    a fastener configured to tighten the pin relative to the spherical washer to maintain an alignment of the transition piece relative to the casing.

20. The support arrangement of claim 19, wherein the fastener is positioned on an exterior side of the casing and wherein the opening in the casing is sized to include a gap between the pin and the casing such that the pin is rotatable within the opening from the exterior of the gas turbine engine to vary the alignment of the transition piece in a circumferential plane of an end of the transition piece.

* * * * *